(12) United States Patent
Barai et al.

(10) Patent No.: US 11,777,979 B2
(45) Date of Patent: Oct. 3, 2023

(54) SYSTEM AND METHOD TO PERFORM AUTOMATED RED TEAMING IN AN ORGANIZATIONAL NETWORK

(71) Applicant: FIRECOMPASS TECHNOLOGIES PVT LTD, Bangalore (IN)

(72) Inventors: Bikash Barai, Bangalore (IN); Nilanjan De, Bangalore (IN); Jitendra Chauhan, Bangalore (IN); Arnab Kumar Chattopadhayay, Bangalore (IN)

(73) Assignee: Firecompass Technologies Pvt Ltd

( * ) Notice: Subject to any disclaimer, the term of this patent is extended or adjusted under 35 U.S.C. 154(b) by 403 days.

(21) Appl. No.: 17/317,058

(22) Filed: May 11, 2021

(65) Prior Publication Data
US 2021/0352100 A1   Nov. 11, 2021

(30) Foreign Application Priority Data
May 11, 2020  (IN) .............................. 202041019833

(51) Int. Cl.
  *H04L 9/40*    (2022.01)
  *H04L 41/22*   (2022.01)
(52) U.S. Cl.
  CPC .......... *H04L 63/1433* (2013.01); *H04L 41/22* (2013.01); *H04L 63/1416* (2013.01); *H04L 63/1425* (2013.01); *H04L 63/1466* (2013.01)
(58) Field of Classification Search
  CPC . H04L 63/1433; H04L 41/22; H04L 63/1416; H04L 63/1425; H04L 63/1466
  See application file for complete search history.

(56) References Cited

U.S. PATENT DOCUMENTS

| | | | |
|---|---|---|---|
| 10,367,834 B2 * | 7/2019 | Sweet | H04L 63/1433 |
| 10,701,100 B2 | 6/2020 | Newman et al. | |
| 10,735,454 B2 | 8/2020 | Ahuja et al. | |
| 11,683,333 B1 * | 6/2023 | Dominessy | H04L 43/045 |
| | | | 726/25 |

(Continued)

OTHER PUBLICATIONS

Blade Risk Manager; https://kdmanalytics.com/wp-content/uploads/2020/05/KDM-Blade-RiskManager-v05-11-2020-web.pdf.

*Primary Examiner* — Stephen T Gundry
(74) *Attorney, Agent, or Firm* — Jason C. Cameron

(57) ABSTRACT

The present invention discloses system and method to perform automated red teaming in organizational network replacing conventional orchestration and playbooks. The method includes obtaining input data and exit criterion for an organization from data sources. Further, the method includes determining attack surface associated with the organization based on the obtained input data and the exit criterion. The method includes identifying attack frontiers for the attack surfaces. Further, the method includes prioritizing the attack frontiers. Additionally, the method includes simulating the attack frontiers at the attack surfaces based on the prioritization. Moreover, the method includes determining attack paths associated with the attack surface based on results of simulation. Also, the method includes learning attack patterns associated with the attack paths based on the results of execution. Further, the method includes generating an artificial intelligence-based security model representing vulnerability of the attack surfaces.

15 Claims, 10 Drawing Sheets

(56) References Cited

U.S. PATENT DOCUMENTS

| | | |
|---|---|---|
| 2020/0082097 A1 | 3/2020 | Poliakov |
| 2021/0273960 A1* | 9/2021 | Humphrey .......... H04L 63/1425 |
| 2022/0210200 A1* | 6/2022 | Crabtree ............... G06F 16/951 |
| 2023/0118388 A1* | 4/2023 | Crabtree ............... H04L 63/123 |
| | | 726/23 |
| 2023/0118563 A1* | 4/2023 | Yadav ................. H04L 63/0227 |
| | | 726/1 |
| 2023/0118726 A1* | 4/2023 | Clayton ............. H04L 63/0876 |
| | | 713/180 |
| 2023/0123314 A1* | 4/2023 | Crabtree ............... H04L 9/0643 |
| | | 726/22 |
| 2023/0171292 A1* | 6/2023 | Crabtree ................ H04L 63/20 |
| | | 726/22 |
| 2023/0208869 A1* | 6/2023 | Bisht ...................... G06N 5/041 |
| | | 726/23 |
| 2023/0208882 A1* | 6/2023 | Crabtree ............. G06F 16/2477 |
| | | 726/22 |

* cited by examiner

SYSTEM AND METHOD TO PERFORM AUTOMATED RED TEAMING IN AN ORGANIZATIONAL NETWORK

CROSS REFERENCE

This Application claims priority from a Provisional patent application filed in India having Patent Application No. 202041019833, filed on May 11, 2020 and titled "SYSTEM AND METHOD TO PERFORM AUTOMATED AND MULTISTAGE ATTACKS."

TECHNICAL FIELD

The present subject matter relates generally to information security systems. More particularly, but not exclusively discloses a system and a method to perform automated red teaming in an organizational network.

BACKGROUND

Organizations are under constant threat of being hacked by unknown hackers on the internet. The organizations need to discover all possible attack paths an attacker may take to breach the organizations' defense. More and more vulnerabilities are discovered every year on known products. Hundreds and thousands of malicious cyberattacks and threat actors are reported by the growing community of threat intelligence. Recently, external attackers and malicious attackers have been successful in breaching various data of the organizations, gaining access to critical assets, moving laterally within the organizations and exfiltrating critical private data. Accordingly, an ability to react to a breach quickly and diligently is crucial for an organization's security team. Out of many approaches to secure an organizational attack, one of the effective way to do it is to find all possible attack paths in the organizations from an external or internal perspective and implement effective mitigation strategies to remove those attack paths.

Various approaches have been introduced which utilize the same approach in different ways. One such approach is known as penetration testing. The main goal of the penetration testing is to find at least one attack path to crown jewel/critical asset of the organizations as a proof of concept and prioritize critical flaws to be remediated. The penetration testing is mostly a semi-automated approach, where the key orchestration of the workflow is managed by security analysts performing the penetration test. Similarly, another such approach is known as Red Teaming One of the key goals of the red teaming is to find various key attack scenarios and launch multistage attacks from an external and internal perspectives. Another key goal of the red teaming is to monitor and measure the effectiveness of defensive teams, process and technology of the underlying organization. However, such approaches are mostly manual. There has been many efforts to automate the red teaming approach via an approach of creating playbooks or workflow by security analysts, and engine to executive the playbooks at certain scheduled intervals. Creating and upgrading playbooks or workflows has multiple gaps such as there is a limit on the number of playbooks that can be created. Secondly human experts are required to create and upgrade these playbooks, and there is a time lag to create and test the playbooks.

Furthermore, another approach is Attack Simulation that builds models of the real-life network using various computational models and performs simulation of attacks on the model. The key goal of such simulation is to detect prioritized attack paths. One of the common models is an attack graph or some variant of it such as attack trees. The attack graphs have been widely used in academics and industry to perform attack simulation, and to perform attack planning to perform real attacks on the network. The attack graphs may also be used to create a risk model of the computer networks and create various mitigation strategies based on the priority to multiple attack paths. However, one of the key disadvantages of this approach is that attack graph generation is a computationally intensive process even for a moderate size network of 32 machines. As a result, various approximations of attack Graphs have been proposed in academia and industry.

Moreover, another technique is attack Emulation. Under this approach, virtual agents are placed or pre-installed at the strategic locations in the organizations to simulate various real-life attack scenarios. The attack scenarios and key steps to emulate them are provided by a central controller. The central controller may create variants of the attack Graph to prioritize attack scenarios as one of the techniques. Such an approach is an example of orchestrated attack emulation where a central controller is required to distribute tasks to various agents. However, the key disadvantage of this approach is that the agents need to be pre-installed at strategic places. Secondly, the agents need to be in communication with the central controller. During the process no real attack might have been launched.

In general, there are few fundamental shortcoming related to orchestrated attack emulation. The communication between central planner and agents may be restricted in terms of bandwidth, firewall restrictions and latency of the communication. As a result, commands sent by the central planner will have latency and may not reach its destination. The latency brings additional challenges when the environment is changing very fast and the window of opportunity is small. For example, defenders may change the firewall rules after detection of an attack. Orchestration approaches also need continuous updates of workflow or playbooks by human experts, the process of managing workflows or playbooks soon becomes a bottleneck.

As a summary, current approaches and methodologies:

1. Require Attack Graph or its variants generation, that is a P-Space problem.
2. Require Orchestration and central controller to plan and distribute actions to agent such as used in many breach risk simulation.
3. Require Security experts to design workflow/playbooks.
4. Require highly skilled team as in conventional Red Teaming Companies.
5. None of the approaches considers the scenario when network graph is changing very fast.

Hence, there is a need for an improved system and method to perform automated red teaming to address the issue(s)

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a system to perform automated red teaming in an organizational network. The system includes a hardware processor; and a memory coupled to the processor. The memory includes a set of program instructions in the form of a plurality of subsystems, configured to be executed by the processor. The plurality of subsystems includes a secure data gathering subsystem configured to obtain an input data and an exit criterion for an organization from one or more data sources via a communication network. Further, the plurality of subsystems further includes attack surface determination subsystem configured to automatically determine one or more attack surface associated with the organization based on the obtained input data and the exit criterion. The one or more attack surfaces comprises least secure points in the organizational network. Furthermore, the plurality of subsystems includes an attack frontier identifier subsystem configured to identify one or more attack frontiers for each of the determined one or more attack surfaces. The one or more attack frontiers comprises a set of security attacks to be launched at the determined one or more attack surface. Furthermore, the plurality of subsystems includes prioritization subsystem configured to prioritize each of the identified one or more attack frontiers using one or more pre-defined prioritization strategies. Additionally, the plurality of subsystems includes emulation subsystem configured to emulate the identified one or more attack frontiers at the determined one or more attack surfaces based on the prioritization. Moreover, the plurality of subsystems includes attack path determination subsystem configured to determine one or more attack paths associated with at least one of the one or more attack surface based on results of simulation. The plurality of subsystem further includes a learning subsystem configured to continuously learn attack patterns associated with the determined one or more attack paths based on the results of execution using a plurality of learning techniques. Furthermore, the plurality of subsystem includes an artificial intelligence-based security model generation subsystem configured to generate an artificial intelligence-based security model representing vulnerability of the one or more attack surfaces based on the learnt attack patterns. The artificial intelligence-based security model comprises attack paths correlated with the attack patterns and a risk value associated with each of the one or more attack path.

Further, the present disclosure includes is a method to perform automated red teaming in an organizational network. The method includes obtaining an input data and an exit criterion for an organization from one or more data sources via a network. Further, the method includes automatically determining one or more attack surface associated with the organization based on the obtained input data and the exit criterion. The one or more attack surfaces comprises least secure points in the organizational network. The method further includes identifying one or more attack frontiers for each of the determined one or more attack surfaces. The one or more attack frontiers comprises a set of security attacks to be launched at the determined one or more attack surface. Further, the method includes prioritizing each of the identified one or more attack frontiers using one or more pre-defined prioritization strategies. Additionally, the method includes simulating the identified one or more attack frontiers at the determined one or more attack surfaces based on the prioritization. Moreover, the method includes determining one or more attack paths associated with at least one of the one or more attack surface based on results of simulation. Also, the method includes continuously learning attack patterns associated with the determined one or more attack paths based on the results of execution using a plurality of learning techniques. Further, the method includes generating an artificial intelligence-based security model representing vulnerability of the one or more attack surfaces based on the learnt attack patterns. The artificial intelligence-based security model comprises attack paths correlated with the attack patterns and a risk assessment value associated with each of the one or more attack surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
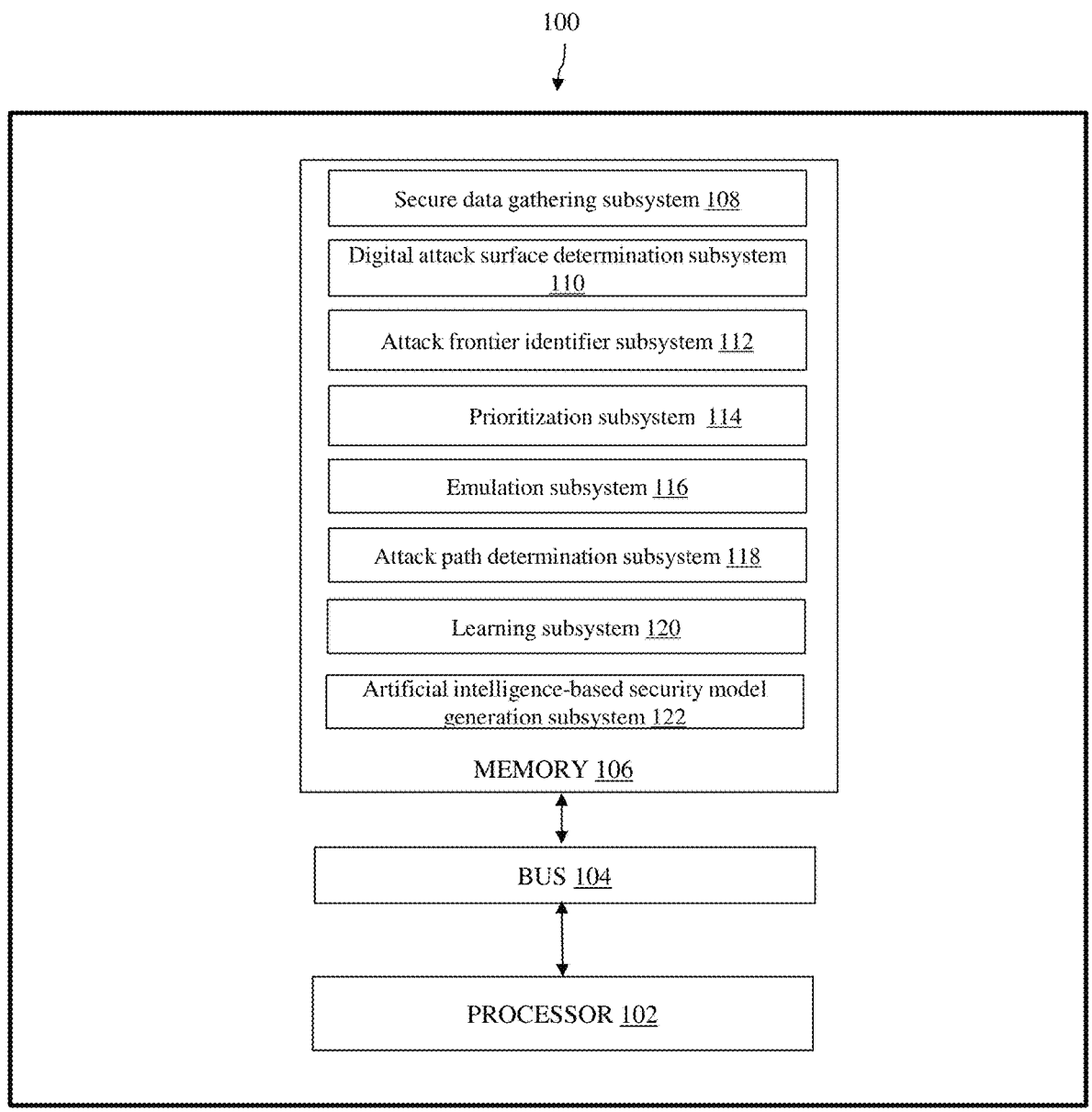
FIG. 1 is a block diagram of a computing system capable of performing automated red teaming in an organizational network, according to an embodiment of the present invention.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Throughout the specification, the terms "subsystem" and "module" are used interchangeably.

The present invention provides a system and method to perform automated red teaming in accordance with an embodiment of the present disclosure. The system utilizes a novel approach which discards a need of central planner and enables each of attack subsystems to take a decision by itself in order to launch itself based on one or more predefined conditions and writes the output at a designated place without the need of any planning engine and/or launching other subsystems. Such novel approach is defined as automated choreography to find automated red teaming Using choreography, the system is able to discover one or more new attack paths or one or more attack frontiers, prioritize the one or more attack paths or the one or more attack frontiers and execute attacks in the sequence of the one or more attack paths. In the absence of central planner, each module has ability to learn using various learning techniques from historical data so that next time each module takes more precise and intelligence actions. The present system is related to launching real attacks on the target network and may generate attack graph as one of the steps, however, it does not solely depend on it. The present system uses fundamentally a different and novel approach, named as attack Choreograph that mitigate aforementioned shortcomings. The present system emulates real attacks on target networks using a novel technique of automated choreography. Automated Choreography, in the field of automated attack emulation, is an approach of executing multiple chains of atomic attacks without need of a central authority or controller. Input to the present system can be as simple as a domain name or an IP address or email address and exit criteria specifying when the system should stop. The output of the system consists of successful attack paths, attack paths that have failed, and high priority security flaws to fix.

Referring now to the drawings, and more particularly to FIGS. 1 through 9A-B, where similar reference characters denote corresponding features consistently throughout the figures, there are shown preferred embodiments and these embodiments are described in the context of the following exemplary system and/or method.

FIG. 1 is a block diagram of a computing system 100 capable of performing automated red teaming in an organizational network, according to an embodiment of the present invention. According to FIG. 1, the computing system 100 includes a processor 102, a memory 106, and a bus 104. The memory 106 includes a plurality of subsystem which further includes a secure data gathering subsystem 108, an attack surface determination subsystem 110, an attack frontier identifier subsystem 112, a prioritization subsystem 114, an emulation subsystem 116, an attack path determination subsystem 118, a learning subsystem 120 and an artificial intelligence-based security model generation subsystem 122. The processor 102, and the memory 106, may be communicatively coupled by a system bus such as a system bus 104 or a similar mechanism.

The processor 102 may be configured to implement functionality and/or process instructions for execution within the computing system 100. The processor 102 may be capable of processing instructions stored in the memory 106. The processor 102 may include any one or more of a processors, a controller, a digital signal processor (DSP), an application specific integrated circuit (ASIC), a field-programmable gate array (FPGA), or equivalent discrete or integrated logic circuitry. Additionally, the functions attributed to the processor 102, in this disclosure, may be embodied as software, firmware, hardware or any combination thereof. The processor 102 as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, or any other type of processing circuit. The processor 102 may also include embedded controllers, such as generic or programmable logic devices or arrays, application specific integrated circuits, single-chip computers, smart cards, and the like.

The memory 106 may be configured to store security attacks related information during the operation. The memory 106 may, in some examples, be described as a computer-readable storage medium. The memory 106 may be described as a volatile memory, meaning that the memory does not maintain stored contents when the computer is turned off. Examples of volatile memories include random access memories (RAM), dynamic random-access memories (DRAM), static random-access memories (SRAM), and other forms of volatile memories known in the art. In some examples, the memory 106 may be used to store program instructions for execution by processor 106. Specifically, the memory 106 includes a set of program instructions in the form of a plurality of subsystems, configured to be executed by the processor 102. For example, the plurality of subsystems includes the secure data gathering subsystem 108, the attack surface determination subsystem 110, the attack frontier identifier subsystem 112, the prioritization subsystem 114, the emulation subsystem 116, the attack path determination subsystem 118, the learning subsystem 120 and the artificial intelligence-based security model generation subsystem 122, stored in the form of program instructions for execution by the processor 102. The plurality of subsystems can be implemented as software, hardware, or some combination of software and hardware. For example, the plurality of subsystems could be implemented as a part of an application specific integrated circuit (ASIC). The plurality of subsystems includes routines, programs, objects, components, data structures, and the like, which perform particular tasks or implement particular abstract data types.

According to an embodiment described herein, the secure data gathering subsystem 108 is configured to obtain an input data and an exit criterion for an organization from one or more data sources via a network. In one embodiment, the input data may include variant of an attack graph termed as Z-graph. The Z-Graph is a form of a graph where nodes are entities and edges are relations between the entities. An entity can be any concept (Intangible or tangible) such as IP Address, Email Address, Vulnerability and the like. In such embodiment, the Z-graph may include multi directional-graph to store results produced from various modules. The multidirectional-graph property allows Z-graph to store multiple edges between two nodes. Each node can be either an Entity (IP address, Domain name, Application) or one or more nodes that are used to augment the Z-Graph with instructions, priority, and other metadata. Edges in the Z-Graph are relations, where each relation store relation metadata including Relation Type and Module that discovered the relation, timestamp and the like. In one embodiment, the exit criteria may include a higher order logical expression. In another embodiment, the exit criteria may include a higher order logical expression. The exit criteria specify guidelines or rules to stop execution of the system. The one or more data sources are databases such as cloud databases configured to store all information associated with the network assets and the one or more attack surfaces. Further, the secure data gathering subsystem 108 comprises a Z graph indexer which index or update the Z-Graph based on various messages published on the Message Board.

The attack surface determination subsystem 110 is configured to automatically determine one or more attack surface associated with the organization based on the obtained input data and the exit criterion. The one or more attack surfaces comprises least secure points in the organizational network. The one or more attack surfaces comprises databases, cloud buckets, code leaks, exposed credentials, risky cloud assets, open ports, programmable instructions or cloud data, network data, source code or object code, any software instance or a hardware instance, computer program, secure keys, transaction data and the like.

In order to automatically determine the one or more attack surfaces, the attack surface determination subsystem 110 is configured to determine list of connected network assets present in an organizational network based on the obtained input data and the exit criterion. The organizational network comprises one or more attack surfaces existing internally or externally of the network assets. In an embodiment, the one or more network assets comprises storage units such as databases, cloud applications, IT assets, network peripherals, hub, router, cables, wires, gateways and the like. Further, the attack surface determination subsystem 110 is configured to determine one or more network parameters associated with the one or more attack surfaces based on the determined list of connected network assets. The one or more network parameters comprises internet protocol (IP) address, communication protocol, communication channel, topology, connectivity status, and the like. Further, the attack surface determination subsystem 110 is configured to determine whether the one or more network parameters matches with a corresponding pre-stored one or more network parameters. Furthermore, the attack surface determination subsystem 110 is configured to determine the one or more attack surfaces susceptible to security attacks if the one or more network parameters fail to match with the corresponding pre-stored one or more network parameters. For example, if the connectivity status of a cloud gateway is faulty, then the cloud gateway is determined to be susceptible to security attack.

The attack frontier identifier subsystem 112 is configured to identify one or more attack frontiers for each of the determined one or more attack surfaces. The one or more attack frontiers comprises a set of security attacks to be launched at the determined one or more attack surface 412A-N. Specifically, the attack frontier is the set of all set attacks that can be launched given the current state of Z-Graph. In order to identify the one or more attack frontiers, the attack frontier identifier subsystem 112 is configured to determine type of the one or more attack surfaces based on the obtained input data and the exit criterion. The type of the one or more attack surfaces may be storage type, gateway type, hardware resources, network resource, software resources, and the like. The attack frontier identifier subsystem 112 is configured to determine one or more behavioral parameters associated with the one or more attack surfaces based on the obtained input data and the exit criterion and the determined type of the one or more attack surfaces. The one or more behavioral parameters comprises current state, historical events, and current configuration of the one or more attack surfaces. Furthermore, the attack frontier identifier subsystem 112 is configured to analyze time series data associated with the one or more attack surfaces. Also, the attack frontier identifier subsystem 112 is configured to correlate the determined one or more behavioral parameters and the analyzed time series data with a corresponding pre-stored behavioral parameters and the pre-stored time series data. Furthermore, the attack frontier identifier subsystem 112 is configured to identify the one or more attack frontiers applicable to each of the determined one or more attack surfaces based on the correlation and the type of one or more attack surfaces. As used herein, the term 'one or more attack frontiers' are defined as set of all set of attacks which may be launched from a given current state of Z-graph. Similarly, the term 'attack' used herein is defined as an attack on organizational network, one or more applications, human resources of the organization, one or more information technology components and the like which a hacker could attack.

The prioritization subsystem 114 is configured to prioritize each of the identified one or more attack frontiers using one or more pre-defined prioritization strategies. In one embodiment, the prioritization of the one or more attack frontiers may be performed in a plurality of ways, wherein the plurality of ways may include, but not limited to, assigning rewards, penalty and the like. In such embodiment, the prioritization subsystem 114 may include a plurality of strategies such as correlation, anomaly detection and prioritization. The correlation is utilized for combining multiple facts available in the Z-Graph and infer what further actions can be taken. The correlation includes an advanced form of correlation which is performed on meta-rules defined. In one embodiment, the advanced form of the correlation is based on various strategies such as graph data-based correlation, time series data-based correlation and the like. Correlation is the process of combining multiple facts available in Z-Graph and infer what further actions can be taken. Currently, the prioritization subsystem 114 performs correlation based on meta rules defined in the system. However, the prioritization subsystem 114 supports advanced forms of correlation based on various strategies such as Graph Data Based Correlation, Time Series Data based Correlation and the like. As an example, when Z-Graph is updated with login forms without captcha protection, and leaked credentials (Usernames and Passwords), the prioritization subsystem 114 detects it and update attack frontier to perform Login Brute forcing attacks.

Similarly, the anomaly detection is another strategy to identify one or more outliers in the Z-graph and either update the one or more attack frontiers for the prioritization. As an example, if the prioritization subsystem 114 detects a new port, say port tcp/27017 (mongodb port), it will be considered as outlier and all the attacks related to the port tcp/27017 are prioritized. Similarly, finding high entropy strings in a document/text file, and updating attack frontier with attacks related to cloud access keys, is another example.

Again, the prioritization strategy uses assignment policy to prioritize the one or more attack frontiers based on one or more historical successful attack paths.

In order to prioritize the one or more attack frontiers, the prioritization subsystem 114 is configured to the prioritization subsystem is configured to determine one or more historical successful attack paths associated with the one or more attack surfaces. The prioritization subsystem 114 is configured to validate the one or more historical successful attack paths based on a set of predefined rules. The set of predefined rules comprises false positive check, and the like. Further, the prioritization subsystem 114 is configured to determine a priority assignment policy for prioritizing each of the identified one or more attack frontiers based on successful validation. The priority assignment policy comprises guidelines for assigning priority to the one or more attack frontiers based on the historical successful attack paths. The prioritization subsystem 114 is configured to prioritize each of the identified one or more attack frontiers based on the determined priority assignment policy.

The emulation subsystem 116 is configured to simulate the identified one or more attack frontiers at the determined one or more attack surfaces based on the prioritization. In order to simulate the one or more attack frontiers, the emulation subsystem 116 is configured to determine one or more tasks to be performed at the one or more attack surfaces by mapping, in the order of priority, the identified one or more attack frontiers with corresponding pre stored tasks. In one embodiment, the one or more tasks may include a discovery task, an attack task and the like. In such embodiment, the discovery task may include reconnaissance. In another embodiment, the attack task may include launching attacks, installing agents, data exfiltration and the like. The discovery task is executed by a discovery module. In one embodiment, the discovery modules may include, but not limited to, a subdomain enumeration module, IP discovery module or an application discovery module. Similarly, the attack task is executed by an attack module. In some embodiment, the attack module may include a login form brute forcing credentials or a module related to exploitation of a vulnerability. The emulation subsystem 116 takes Z-subgraph as input and produces an enriched Z-subgraph as the execution result. The enriched Z-subgraph gets updated with additional nodes and relations depending upon the functionality of the execution module. The enriched Z-subgraph have more or even less nodes and relations depending upon the functionality of the executed module. Furthermore, the enriched Z-subgraph may get pruned where existing nodes and relations gets merged or deleted depending upon the functionality of the emulation subsystem 116.

The emulation subsystem 116 is further configured to generate one or more virtual instances of the determined one or more tasks to be performed at the one or more attack surfaces. Further, the emulation subsystem 116 is configured to simulate the identified one or more attack frontiers at the determined one or more attack surfaces by executing the generated one or more virtual instances of the determined one or more tasks in a virtual simulation network. The virtual simulation network mimics the physical organization network and wherein the virtual simulation network comprises virtual network assets and virtual attack surfaces emulating the physical network assets and the physical attack surfaces, respectively.

The attack path determination subsystem 118 is configured to determine one or more attack paths associated with at least one of the one or more attack surface based on results of simulation. The one or more attack paths are routes or channels through which a security attack/threat may be possible. Specifically, the attack path determination subsystem 118 is configured to determine locations of the one or more attack surfaces susceptible to security attacks based on the results of simulation. The results of simulation includes location information of all the network assets in the organization network. The results of simulation also includes faulty or weak secure points in the entire organizational network and the root causes for the same. Then, the attack path determination subsystem 118 is configured to determine possible communication channels through which the one or more attack surfaces are susceptible to the security attacks. Further, the attack path determination subsystem 118 is configured to determine possible one or more attack paths associated with at least one of the one or more attack surface based on the determined possible communication channels and the locations of the one or more attack surfaces. The one or more attack paths comprises a location of the communication channel connecting the one or more attack surfaces. For example, if a cloud gateway is determined to be susceptible to threat or security attack, then the location of the cloud gateway and all possible communication channels connecting the cloud gateway are scanned to determine the possible one or more attack paths to the cloud gateway.

The learning subsystem 120 is configured to continuously learn attack patterns associated with the determined one or more attack paths based on the results of execution using a plurality of learning techniques. The attack patterns comprises recent trends of security attacks occurred in the past, complete analysis on known and unknown weak secure points and the like. The learning subsystem 120 is configured to learn a set of rules from an execution of the one or more prioritized attack frontiers using a plurality of learning techniques. The learning subsystem 120 learns from the execution of one or more modules in a present assessment or even from the past assessments. The learning subsystem 120 includes an accomplishment of multiple goals such as prioritization of one or more attack frontiers, learning new tasks based on human security analyst's actions, reduce false positives attack frontiers based on detection and the like. The false positives are the attack paths that are considered as valid but actually are not. False Positive reduction is one of primary use cases of learning. The learning subsystem 120 uses historical assessments to detect false positives in the context of the current assessments. For example, a port tcp/9200 is generally a Elasticsearch Database port. However, this port can also be open in various cases when the IP belongs to a certain cloud provider such as GoDaddy. The learning subsystem 120 learns this rule and eliminates or reduces priority of attacks that considers tcp/9200 as Elasticsearch DB.

The learning subsystem 120 is also configured to perform an analysis on the multiple historical attacks based on a learnt and updated model. In one embodiment, the plurality of learning techniques may include, but not limited to, machine learning techniques such as classification, prediction, pruning, correlation, prioritization, active probing, passive data collection and the like. In one non-limiting example, the learning subsystem 120 may combine multiple learning techniques such as graph relational learning, reinforcement learning and deep learning technique (such as Recurring Neural Network (RNN)) to learn tasks such as correlation, prioritization and attacking. The learning subsystem 120 learns new attacks by observing human security analysts' actions. As an example, initially, when a login page and multiple leaked credentials are detected, the prioritization subsystem 114 prioritize Login Form Brute force modules to be executed. However, in a specific instance, the human security analyst uses the same credentials on a MYSQL Port tcp/3306 to authenticate. The learning subsystem 120 learns this example attack and the prioritization subsystem 114 prioritizes a MYSQL Credentials Brute force during the next assessments.

The artificial intelligence-based security model generation subsystem 122 is configured to generate an artificial intelligence-based security model representing vulnerability of the one or more attack surfaces based on the learnt attack patterns. The artificial intelligence-based security model comprises attack paths correlated with the attack patterns and a risk assessment value associated with each of the one or more attack surface. In order to generate the artificial intelligence-based security model, the artificial intelligence-based security model generation subsystem 122 is configured to validate the learnt attack patterns based on one or more pre-stored validation rules. The pre-stored validation rules comprises any standard validation rules known in the art. For example, the validation rules check whether the attack patterns are accurate or not and does not include false positives. Further, the artificial intelligence-based security model generation subsystem 122 is configured to determine whether configuration associated with the one or more digital surfaces require a change based on the validation. The configuration associated with the one or more digital surfaces comprises asset configuration, network configuration, and the like. Further, the artificial intelligence-based security model generation subsystem 122 is configured to update the configuration associated with the one or more digital surfaces based on the determination. For example, if it is determined that the configuration requires a change as the validation was unsuccessful, then the configuration is updated to a new value based on the learnings. Furthermore, the artificial intelligence-based security model generation subsystem 122 is configured to correlate the determined attack paths, and the validated attack patterns with the updated configuration associated the one or more digital surfaces. Also, the artificial intelligence-based security model generation subsystem 122 is configured to assign a risk assessment value for each of the one or more attack surface based on the correlation. The risk assessment value is a measure of level of risk associated with the one or more attack surface. The level of risk comprises no risk, low risk, medium risk and high risk. Furthermore, the artificial intelligence-based security model generation subsystem 122 is configured to generate the artificial intelligence-based security model representing vulnerability of the one or more attack surfaces based on the assigned risk assessment value. The artificial intelligence-based security model comprises the correlation and the risk assessment value associated with each of the one or more attack surface.

The functionalities of the bus 104 are well known to a person skilled in the art and hence the explanation thereof is omitted.

The interface(s) (not shown in FIG) may include a variety of software and hardware interfaces, for example, interfaces for peripheral device(s), such as a keyboard, a mouse, an external memory, and a printer. The interface(s) can facilitate multiple communications within a wide variety of networks and protocol types, including wired networks, for example, local area network (LAN), cable, and the like, and wireless networks, such as Wireless LAN (WLAN), cellular, or satellite.

Those of ordinary skilled in the art will appreciate that the hardware depicted in FIG. 1 may vary for implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 100 as is unique to the present disclosure or necessary for an understanding of the present disclosure is depicted and described. The remainder of the construction and operation of the computing system 100 may conform to any of the various current implementation and practices known in the art.

Figure 2:
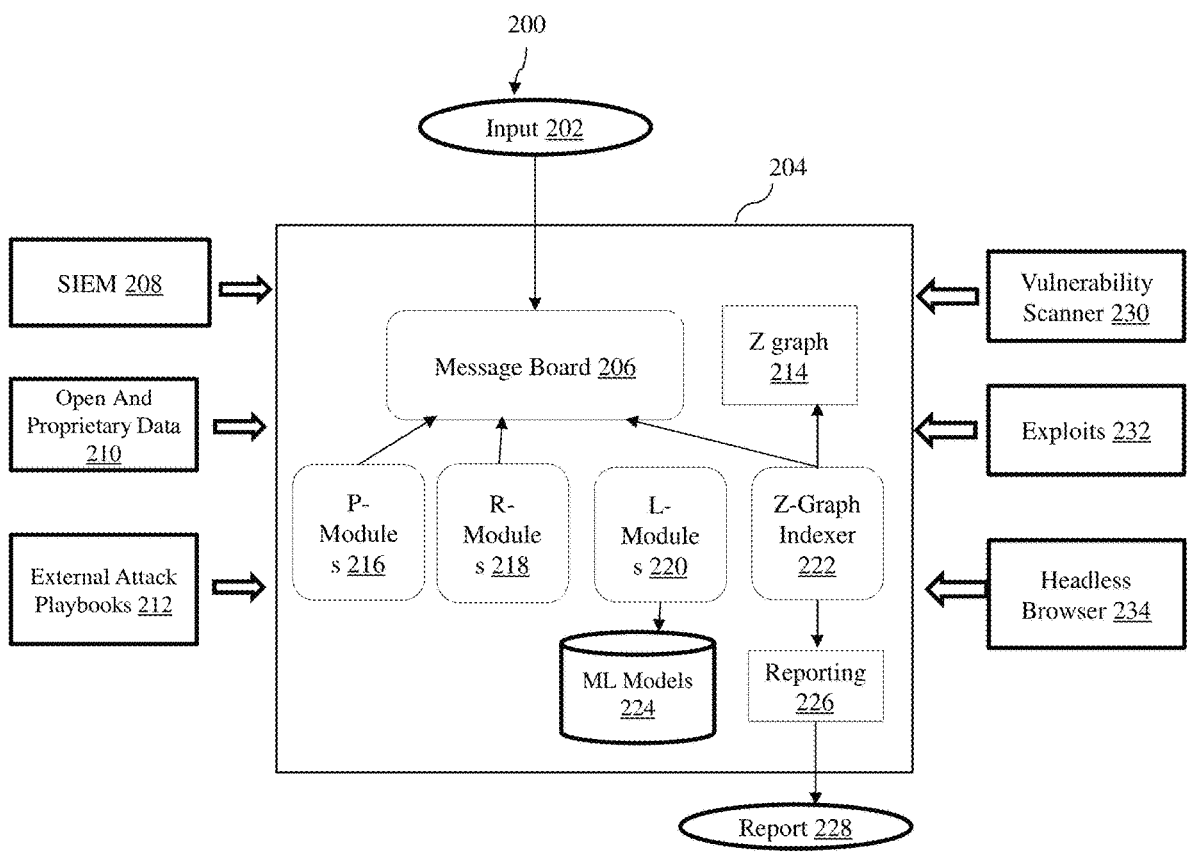
FIG. 2 is an exemplary block diagram depicting a process to perform automated red teaming in an organizational network according to an embodiment of the present invention.

FIG. 2 is an exemplary block diagram 200 depicting a process to perform automated red teaming in an organizational network according to an embodiment of the present invention. In one embodiment of FIG. 1, the system 100 further includes a report generation subsystem 226. The report generation subsystem 226 is configured to generate a plurality of reports upon obtaining a positive response from satisfaction of the exit criteria. In one embodiment, the report generation subsystem 226 generates the plurality of reports which includes output of successful attack paths, summary of failed attack paths and key security flaws to be fixed. The system 100 further includes a message board 206 to push and pull messages from/to various modules. The system 100 further includes a Z-Graph Indexer 222 component that index/update the Z-Graph 214 based on various messages published on the message board 206. In yet another embodiment, the system 100 further includes the one or more external systems and one or more external services which provides information. In such embodiment, the one or more external systems or the one or more external services may include the vulnerability scanners 230, exploits 232, security information and event management (SIEM) 208, proprietary data sources 210, external attack playbooks 212 developed, headless browsers 234 and the like. The system 100 also includes a security analyst workbench to take feedback from human security analysts.

In an embodiment, the above-mentioned plurality of subsystems are triggered in a concurrent manner based on current context and enrichment of the Z-Graph without any central authority and controller. There are certain subsystems that collect data (data ingestion), certain subsystems that prioritize attack paths, certain subsystems that merge duplicate data using techniques such as clustering and the like. The system 100 accepts any possible subgraph of Z-Graph as input. Note that single entity, such domain name or IP address is also a valid Z-Graph. The system also accepts exit criteria in the form First or Higher Order Logic expression as input. The exit criteria specify guidelines when the system should stop execution and produce a report. The system 100 executes one or more prioritization subsystem 114 to prioritize next attack frontier. The emulation subsystem 116 are executed based on prioritized attack frontier. The emulation subsystem 116 accepts Z-Subgraph as input and emit enriched Z-Subgraph. Each Z-Subgraph is merged with master Z-Graph. The learning subsystem 120 are executed to learn new rules and update respective ML Models. The present system 100 checks if the exit criteria is satisfied. If No, the loop goes back to prioritization step. If yes, the loop goes to next step which is generating reports.

Figure 3:
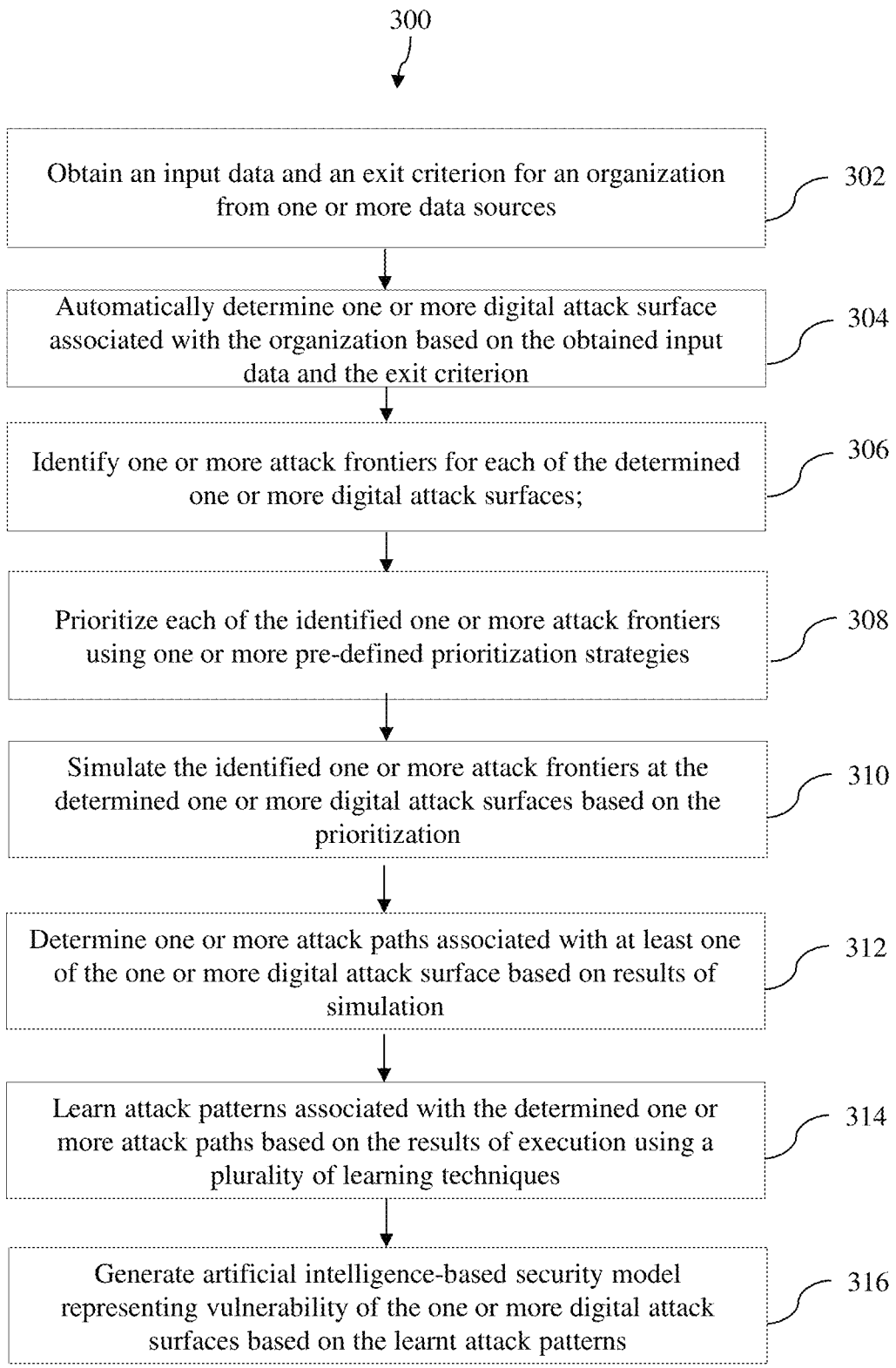
FIG. 3 is a process flowchart illustrating an exemplary method to perform automated red teaming in an organizational network, according to an embodiment of the present invention.

FIG. 3 is a process flowchart illustrating an exemplary method 300 to perform automated red teaming in an organizational network, according to an embodiment of the present invention. At step 302, an input data and an exit criterion for an organization is obtained from one or more data sources via a network. At step 304, one or more attack surface associated with the organization are automatically determined based on the obtained input data and the exit criterion. The one or more attack surfaces comprises least secure points in the organizational network. At step 306, one or more attack frontiers for each of the determined one or more attack surfaces are identified. The one or more attack frontiers comprises a set of security attacks to be launched at the determined one or more attack surface. At step 308, each of the identified one or more attack frontiers are prioritized using one or more pre-defined prioritization strategies. At step 310, the identified one or more attack frontiers are simulated at the determined one or more attack surfaces based on the prioritization. At step 312, the one or more attack paths associated with at least one of the one or more attack surface are determined based on results of simulation. At step 314, attack patterns associated with the determined one or more attack paths are continuously learnt based on the results of execution using a plurality of learning techniques. At step 316, an artificial intelligence-based security model representing vulnerability of the one or more attack surfaces is generated based on the learnt attack patterns. The artificial intelligence-based security model comprises attack paths correlated with the attack patterns and a risk assessment value associated with each of the one or more attack surface. Further, the method 300 comprises outputting the generated artificial intelligence-based model on a user interface of a user device.

In automatically determining the one or more attack surface associated with the organization based on the obtained input data and the exit criterion, the method comprises determining list of connected network assets present in an organizational network based on the obtained input data and the exit criterion. The organizational network comprises one or more attack surfaces existing internally or externally of the network assets. The method includes determining one or more network parameters associated with the one or more attack surfaces based on the determined list of connected network assets. Further, the method includes determining whether the one or more network parameters matches with a corresponding pre-stored one or more network parameters. Also, the method includes determining the one or more attack surfaces susceptible to security attacks if the one or more network parameters fail to match with the corresponding pre-stored one or more network parameters.

In identifying one or more attack frontiers for each of the determined one or more attack surfaces, the method comprises determining type of the one or more attack surfaces based on the obtained input data and the exit criterion. Further, the method includes determining one or more behavioral parameters associated with the one or more attack surfaces based on the obtained input data and the exit criterion and the determined type of the one or more attack surfaces. The one or more behavioral parameters comprises current state, historical events, and current configuration of the one or more attack surfaces. Further, the method includes analyzing time series data associated with the one or more attack surfaces. Also, the method includes correlating the determined one or more behavioral parameters and the analyzed time series data with a corresponding pre-stored behavioral parameters and the pre-stored time series data. Further, the method includes identifying the one or more attack frontiers applicable to each of the determined one or more attack surfaces based on the correlation and the type of one or more attack surfaces.

In prioritizing each of the identified one or more attack frontiers using one or more pre-defined prioritization strategies, the method comprises determining one or more historical successful attack paths associated with the one or more attack surfaces. Further, the method includes validating the one or more historical successful attack paths based on a set of predefined rules. Also, the method includes determining a priority assignment policy for prioritizing each of the identified one or more attack frontiers based on successful validation. Also, the method includes prioritizing each of the identified one or more attack frontiers based on the determined priority assignment policy.

In simulating the identified one or more attack frontiers at the determined one or more attack surfaces based on the prioritization, the method comprises determining one or more tasks to be performed at the one or more attack surfaces by mapping, in the order of priority, the identified one or more attack frontiers with corresponding pre stored tasks. The method also includes generating one or more virtual instances of the determined one or more tasks to be performed at the one or more attack surfaces. The method includes simulating the identified one or more attack frontiers at the determined one or more attack surfaces by executing the generated one or more virtual instances of the determined one or more tasks in a virtual simulation network. The virtual simulation network mimics the physical organization network and where the virtual simulation network comprises virtual network assets and virtual attack surfaces emulating the physical network assets and the physical attack surfaces, respectively.

In determining one or more attack paths associated with at least one of the one or more attack surface based on results of simulation, the method comprises determining locations of the one or more attack surfaces susceptible to security attacks based on the results of simulation. Further, the method includes determining possible communication channels through which the one or more attack surfaces are susceptible to the security attacks. Further, the method includes determining possible one or more attack paths associated with at least one of the one or more attack surface based on the determined possible communication channels and the locations of the one or more attack surfaces. The one or more attack paths comprises a location of the communication channel connecting the one or more attack surfaces.

In generating the artificial intelligence-based security model representing vulnerability of the one or more attack surfaces based on the learnt attack patterns, the method comprises validating the learnt attack patterns based on one or more pre-stored validation rules. The method includes determining whether configuration associated with the one or more digital surfaces require a change based on the validation. Further, the method includes updating the configuration associated with the one or more digital surfaces based on the determination. Further, the method incudes correlating the determined attack paths, and the validated attack patterns with the updated configuration associated the one or more attack surfaces. Also, the method includes assigning a risk assessment value for each of the one or more attack surface based on the correlation. Furthermore, the method includes generating the artificial intelligence-based security model representing vulnerability of the one or more attack surfaces based on the assigned risk assessment value. The artificial intelligence-based security model comprises the correlation and the risk assessment value associated with each of the one or more attack surface.

The method 300 can be implemented in any suitable hardware, software, firmware, or combination thereof.

Figure 4:
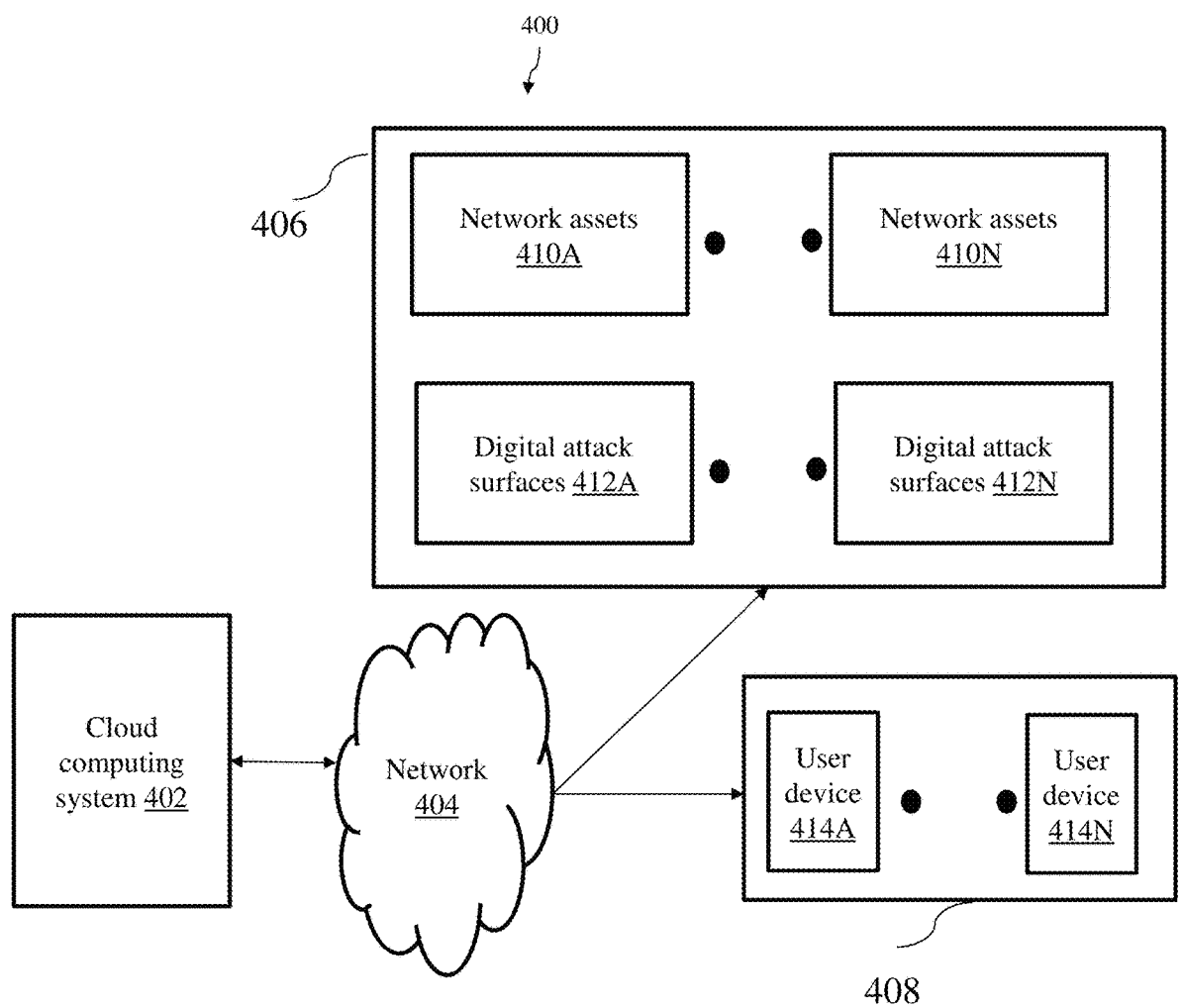
FIG. 4 is a block diagram of a cloud computing environment capable of performing automated red teaming, according to an embodiment of the present invention.

FIG. 4 is a block diagram of a cloud computing environment 400 capable of performing automated red teaming according to an embodiment of the present invention. The cloud computing environment 400 comprises cloud computing system 402, such as those of computing system 100 as shown in FIG. 1. The cloud computing system 402 is communicatively connected to an organizational network 406 and a user network 408 via a network 404. The organizational network 406 further comprises one or more network assets 410A-N. Each of these one or more network assets 410A-N are connected to one or more attack surfaces 412A-N either internally (e.g., as an internal resource of the network assets 410A-N) or externally (e.g., as an external resource). Further, the user network 408 includes one or more user devices 414A-N configured to access the one or more network assets 410A-N and/or the one or more attack surfaces 412A-N. The cloud computing system 402 is capable of delivering cloud platform for managing the organizational network 406 and the user network 408. The cloud computing system 402 further includes a cloud interface, a server including hardware assets and an operating system (OS), a network interface, and application program interfaces (APIs). Throughout the specification the term 'cloud computing system' may also be referred as 'system' and the 'computing system'. In an embodiment, the organizational network 406 may be any enterprise processing network comprising configurable computing physical and logical assets, for example, networks, servers, storage, applications, services, and the like. The organizational network 406 pertains to one organization and hence is secured within the organization. No users outside the organization has access to any of the one or more network assets 410A-N and the one or more attack surfaces 412A-N. Every user device 414A-N within the same network 406 requires an authorized communication channel to access the one or more network assets 410A-N and the one or more attack surfaces 412A-N.

The one or more network assets 410A-N may include storage units such as databases, cloud applications, IT assets, network peripherals, hub, router, cables, wires, gateways and the like. The one or more attack surfaces 412A-N may include databases, cloud buckets, code leaks, exposed credentials, open ports, programmable instructions or cloud data, network data, source code or object code, any software instance or a hardware instance, computer program, secure keys, transaction data and the like.

The user devices 414A-N can be a laptop computer, desktop computer, tablet computer, smartphone and the like. The user devices 414A-N can access cloud applications (such as providing attack prevention platform) via a web browser.

Figure 5:
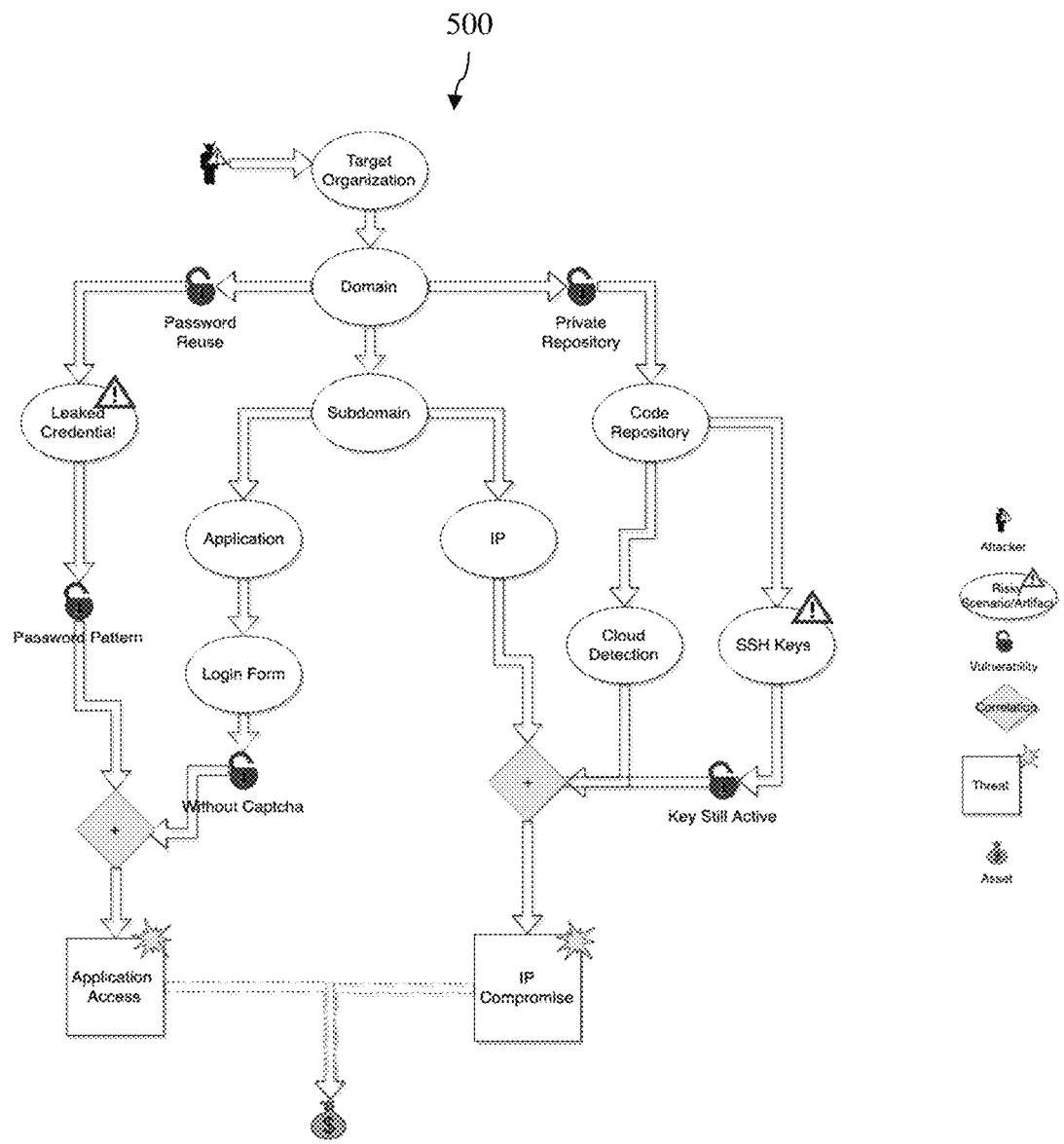
FIG. 5 is an exemplary workflow depicting automated red teaming, according to an embodiment of the present invention.

FIG. 5 is an exemplary workflow 500 depicting automated red teaming, according to an embodiment of the present invention. According to FIG. 5, the workflow starts with a target domain. Next, the workflow finds subdomains and applications. Later, the workflow finds leaked passwords. Next, the workflow applies application Brute Force to try leaked passwords and obtain partial privilege. Finally, a privilege escalation exploit is used.

Figure 6:
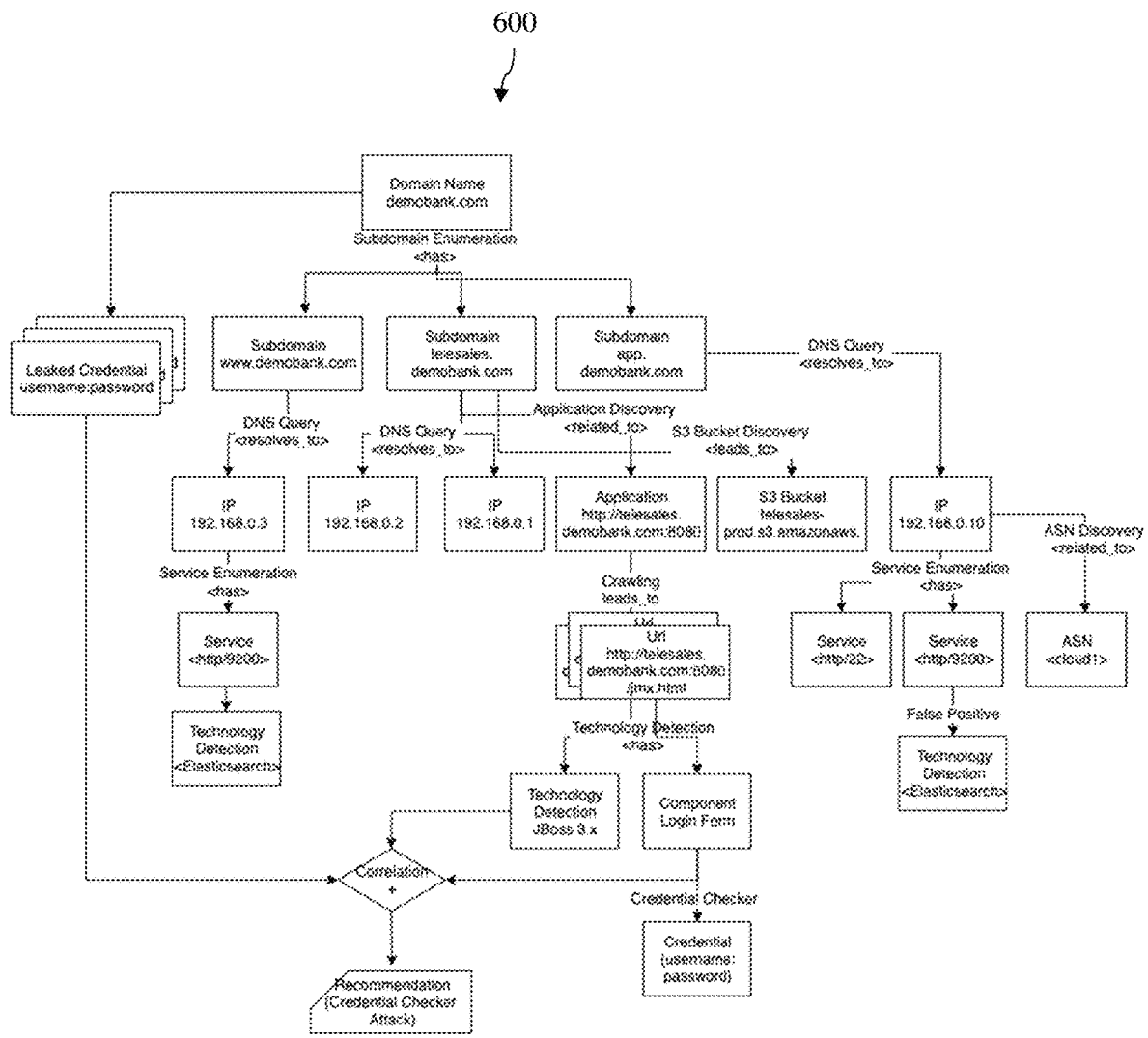
FIG. 6 depicts an exemplary Z graph, according to an embodiment of the present invention.

FIG. 6 depicts an exemplary Z graph, according to an embodiment of the present invention. Z-graph is a special purpose multi di-graph to store results produced from various modules. Multi Di-Graph property allows Z-graph to store multiple edges between two nodes. Each node can be either an Entity (IP address, Domain name, Application) or Special Nodes that are used to augment Z-Graph with instructions, priority, and other metadata. Edges in Z-Graph are relations, where each relation store relation metadata including Relation Type and Module that discovered the relation, timestamp and the like.

Figure 7:
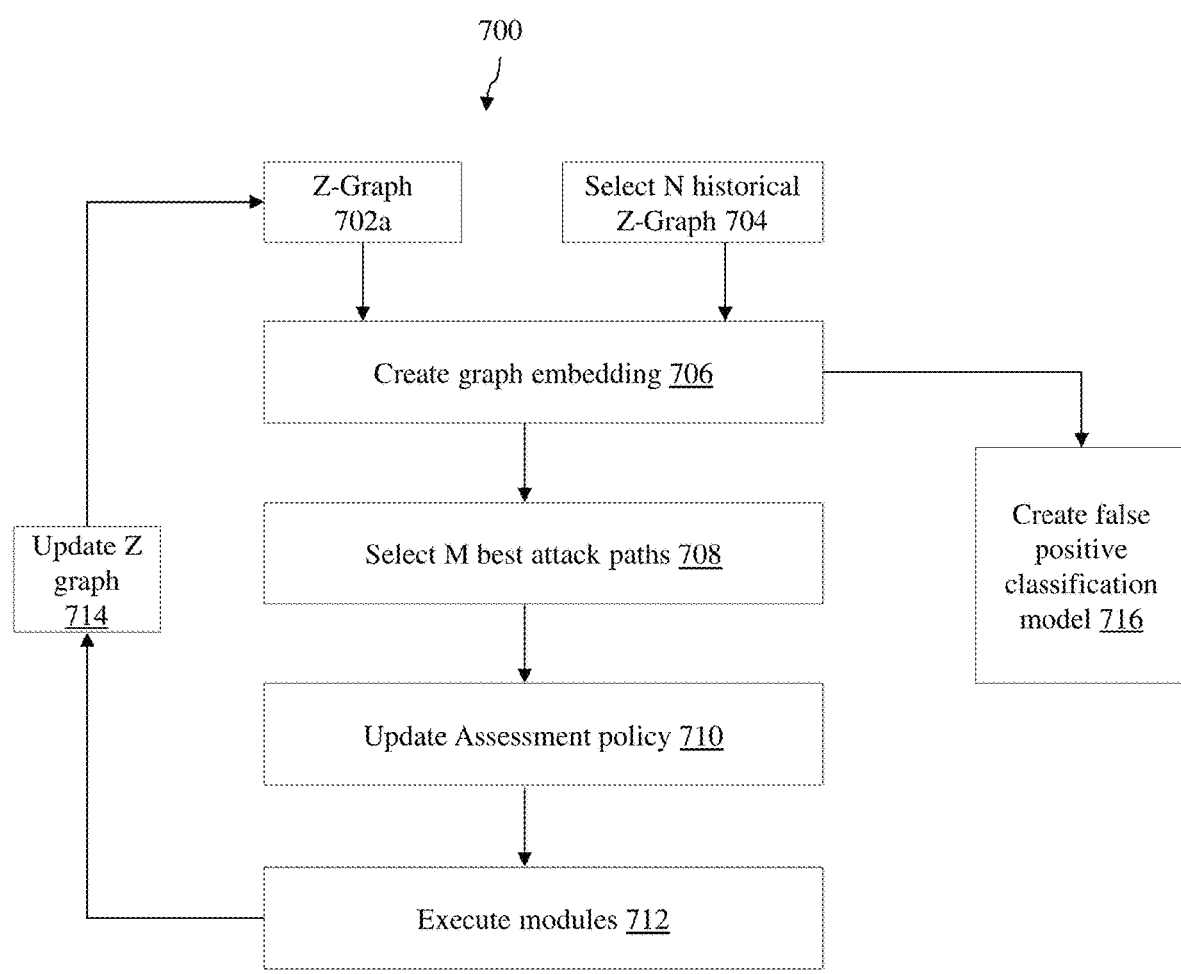
FIG. 7 depicts an exemplary workflow performed by learning subsystem 120 according to an embodiment of the present invention.

FIG. 7 depicts an exemplary workflow performed by learning subsystem 120 according to an embodiment of the present invention. The learning subsystem 120 has Z-Graph 702a related to current ongoing assessment. At step 704, the learning subsystem 120 selects 'N' Z-Graph's 702b from historical assessments. N is generally 100, however this can be chosen to any number. At step 706, the learning subsystem 120 may execute graph embedding algorithm to create vectors representation graphs. The vectors are created in such a way that if two nodes/relations are similar, considering neighborhood in the graph, two nodes/relations are assigned very similar vectors. At step 708, the learning subsystem 120 selects M best attack paths and at step 710 updates assessment policy. At step 712, the learning subsystem 120 prioritize attacks based on assessment policy. All the above steps are repeated multiple times during an assessment. At step 714, Z graph is updated and loop goes back to step 702a. At step 716, false positive classification model is created.

Figure 8:
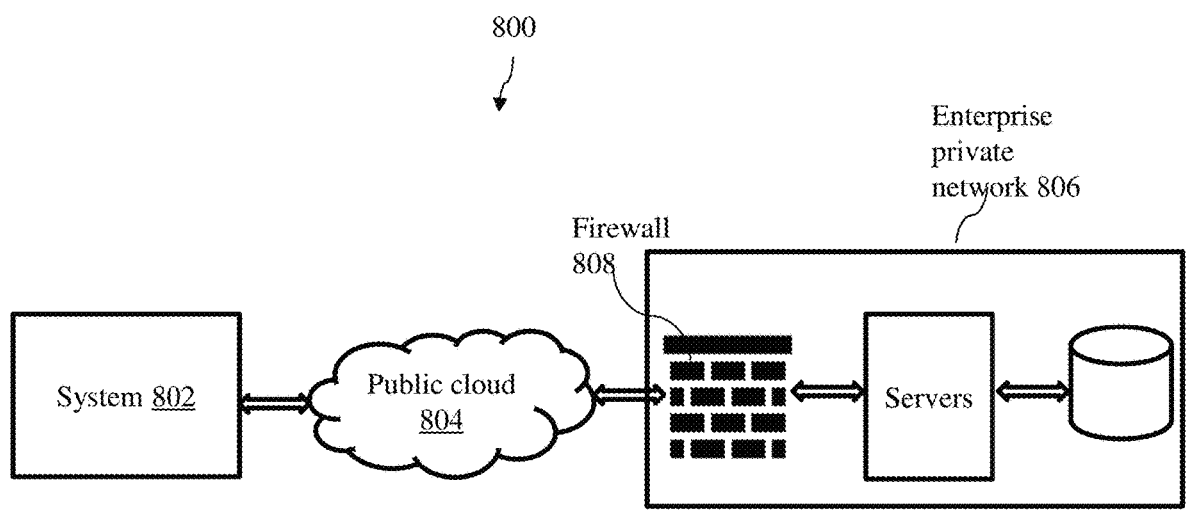
FIG. 8 is a block diagram illustrating an exemplary organizational network, according to another embodiment of the present invention.

FIG. 8 is a block diagram illustrating an exemplary organizational network, according to another embodiment of the present invention. The present system 802 may be deployed as a single or cluster of Hardware (commodity hardware or specialized hardware) in any data center. From the view of deployment, the system 802 discover, probe and perform assessment of all assets (servers, applications and the like) deployed on the public cloud 804 such as Amazon AWS or any enterprise private network 806 protected by a firewall 808. The system 802 also has ability to extend its functionality by deploying agents, extensions of the system, inside the private (firewalled) enterprise network 806. Agents allow execution of modules from the view of internal private (firewalled) enterprise network 806. The system 802 consumes services from various third-party services. Few examples of third-party services are vulnerability scanning services, dark web monitoring services and the like. The system 802 is able to ingest data from various data feeds such as threat intelligence feeds, SIEM Services, Social Network Monitoring Services and the like. The system 802 is also able to monitor Dark Web, Social Networking Sites, Private Discussion Forums and the like.

Figure 9A:
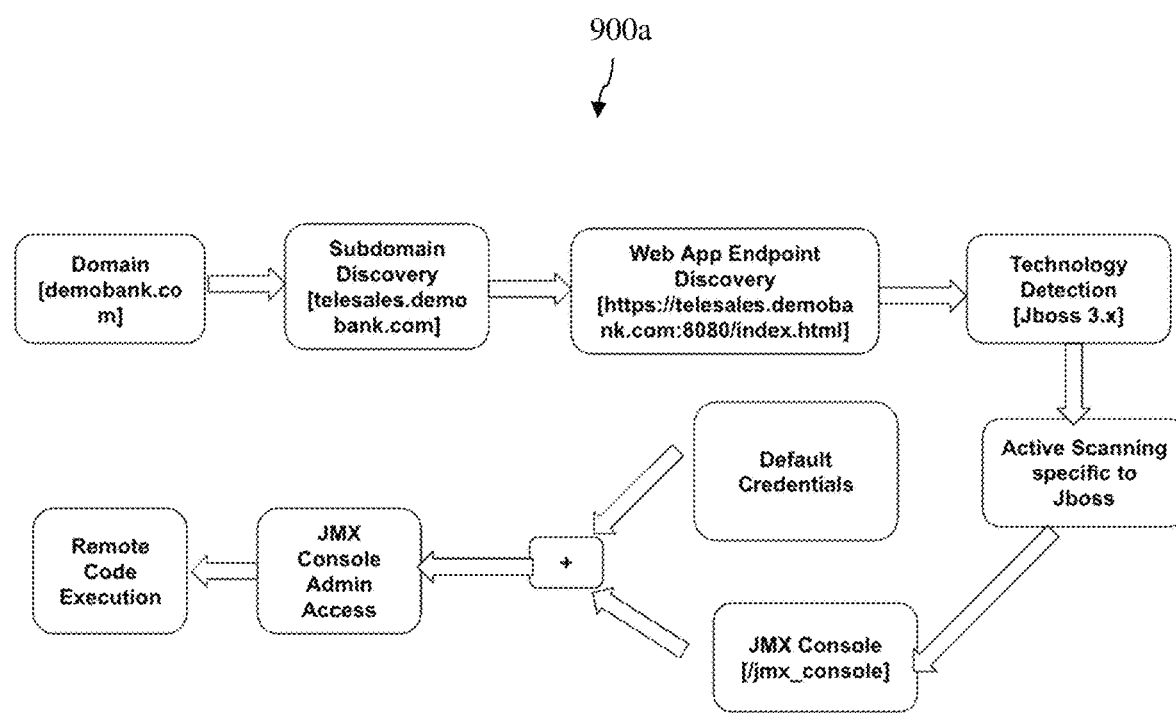
FIG. 9A-B depicts an exemplary attack path generated according to an embodiment of the present invention.
Figure 9B:
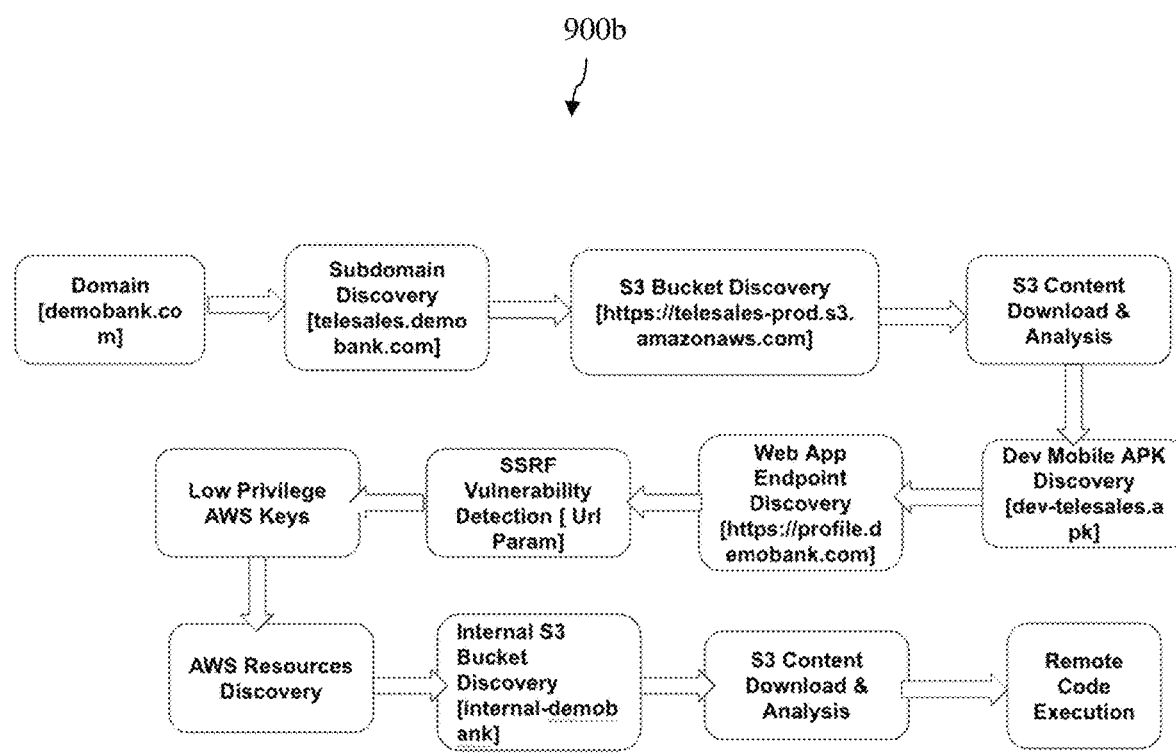

FIG. 9A-B depicts an exemplary attack path generated according to an embodiment of the present invention. In FIG. 9A, the system 100 is able to get admin access to the Web Admin console of the JBOSS server, named JMX console. The JMX console allows attacker to upload arbitrary "war" files, with possible Remote Code Execution (RCE) payload to get command shell on the server. Attack Path: The attack involve various stages as described below:

The attack starts with a domain name, demobank.com, and with zero knowledge. Various steps of passive information gathering discovers subdomains, IPs, Mobile Apps, Web Apps and the like. One of the subdomain is discovered named, telesales.demobank.com, as part of the process.

Later, an API endpoint/Web App got discovered named https://telesales.demobank.com:8080. The subsequent technology detection reveals JBOSS powered the web app. Further, an active scanning reveals that JBOSS is misconfigured to reveal JMX console protected by username and password. Further, the system performs brute force attack on the JBOSS server with a list of credentials and discovered weak username and password of the admin account. Furthermore, the admin account on the JMX console allow arbitrary code to be executed on the JBOSS server.

In FIG. 9B, the present system 100 performs the attack on an AWS cloud infrastructure. The starting point of the attack is the domain name. At the end of the attack, attacker gets access to the admin AWS keys that gives arbitrary access on the AWS infrastructure. Attack Path: The attack involve various stages as described below:

The attack starts with a domain name, demobank.com. Passive information gathering reveals subdomains and subsequently an S3 bucket, tele sales-prod. The bucket is publicly exposed and contains various kinds of files just has HTML, CSS, few log files and the like. Later, the analysis of content of S3 bucket reveals a mobile app binary file dev-telesales.apk. SAST on the APK binary reveals web app endpoint, https://profile.demobank.com. Further, the active scanning on the web app reveals a vulnerability named as SSRF. The exploitation of SSRF vulnerability is tricky and depend on the underlying infrastructure such as AWS or Google Cloud and the like. In this case, the exploitation could fetch low privilege AWS keys from the environment variables of the EC2 instance hosting the Web Application. Further AWS resources were discovered using the AWS keys. Few internal S3 buckets were discovered. The S3 buckets content was analyzed to fetch an Admin AWS Key.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments of the system and method for analysis of network attack vulnerability described above enables an automated dissemination of real-world cyber-attack intelligence with construction of an attack scenario. The system does not require a central controller which means no orchestration is required as compared to conventional systems. Moreover, the system reduces the computational and memory complexity. Also, the system reduces latency, as a result, can be conducted at a continuous basis. There is no single point of failure exist in the system. Organizations need to discover all possible attack paths an attacker may take to breach organization defense. In order to simulate or emulate such attack paths current day approach entails generation of attack plans by way of using central planning engine. The present system uses a different approach which discards the need of central planner and makes each of the attack modules function on their own in an automated choreography-based model. Each attack module makes its own decision to launch itself based on certain conditions and writes the output at designated place without the need of any planning engine and/or launching other modules. Using Choreography, the present system is able to discover new attack paths, prioritize the attack paths and execute attacks in the sequence of attack paths. The embodiment thus provides a platform which automates the process of launching red teaming.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-RAY) and DVD.

Input/output (I/O) devices (including but not limited to keyboards, displays, pointing devices, and the like) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A system for performing automated red teaming in an organizational network, the system comprising:
   a hardware processor; and
   a memory coupled to the processor, wherein the memory comprises a set of program instructions in the form of a plurality of subsystems, configured to be executed by the processor, wherein the plurality of subsystems comprises:
   a secure data gathering subsystem configured to obtain an input data and an exit criterion for an organization from one or more data sources via a network, wherein the input data comprises an attack graph and the exit criterion comprises a set of rules;
   an attack surface determination subsystem configured to automatically determine one or more attack surface associated with the organization based on the obtained input data and the exit criterion, wherein the one or more attack surfaces comprises least secure points in the organizational network;
   an attack frontier identifier subsystem configured to identify one or more attack frontiers for each of the determined one or more attack surfaces, wherein the one or more attack frontiers comprises a set of security attacks to be launched at the determined one or more attack surface;
   a prioritization subsystem configured to prioritize each of the identified one or more attack frontiers using one or more pre-defined prioritization strategies;
   an emulation subsystem configured to simulate the identified one or more attack frontiers at the determined one or more attack surfaces based on the prioritization;
   an attack path determination subsystem configured to determine one or more attack paths associated with at least one of the one or more attack surface based on results of simulation;
   a learning subsystem configured to continuously learn attack patterns associated with the determined one or more attack paths based on the results of execution using a plurality of learning techniques; and
   an artificial intelligence-based security model generation subsystem configured to generate an artificial intelligence-based security model representing vulnerability of the one or more attack surfaces based on the learnt attack patterns, wherein the artificial intelligence-based security model comprises attack paths correlated with the attack patterns and a risk assessment value associated with each of the one or more attack surface.

2. The system as claimed in claim 1, wherein in automatically determining the one or more attack surface associated with the organization based on the obtained input data and the exit criterion, the attack surface determination subsystem is configured to:
   determine list of connected network assets present in an organizational network based on the obtained input data and the exit criterion, wherein the organizational network comprises one or more attack surfaces existing internally or externally of the network assets;
   determine one or more network parameters associated with the one or more attack surfaces based on the determined list of connected network assets;
   determine whether the one or more network parameters matches with a corresponding pre-stored one or more network parameters; and
   determine the one or more attack surfaces susceptible to security attacks if the one or more network parameters fail to match with the corresponding pre-stored one or more network parameters.

3. The system as claimed in claim 1, wherein in identifying one or more attack frontiers for each of the determined one or more attack surfaces, the attack frontier identifier subsystem is configured to:
   determine type of the one or more attack surfaces based on the obtained input data and the exit criterion;
   determine one or more behavioral parameters associated with the one or more attack surfaces based on the obtained input data and the exit criterion and the determined type of the one or more attack surfaces, wherein the one or more behavioral parameters comprises current state, historical events, and current configuration of the one or more attack surfaces;
   analyze time series data associated with the one or more attack surfaces;
   correlate the determined one or more behavioral parameters and the analyzed time series data with a corresponding pre-stored behavioral parameters and the pre-stored time series data; and identify the one or more attack frontiers applicable to each of the determined one or more attack surfaces based on the correlation and the type of one or more attack surfaces.

4. The system as claimed in claim 1, wherein in prioritizing each of the identified one or more attack frontiers using one or more pre-defined prioritization strategies, the prioritization subsystem is configured to:
   determine one or more historical successful attack paths associated with the one or more attack surfaces;
   validate the one or more historical successful attack paths based on a set of predefined rules;
   determine a priority assignment policy for prioritizing each of the identified one or more attack frontiers based on successful validation; and
   prioritize each of the identified one or more attack frontiers based on the determined priority assignment policy.

5. The system as claimed in claim 1, wherein in simulating the identified one or more attack frontiers at the determined one or more attack surfaces based on the prioritization, the emulation subsystem is configured to:
   determine one or more tasks to be performed at the one or more attack surfaces by mapping, in the order of priority, the identified one or more attack frontiers with corresponding pre stored tasks;
   generate one or more virtual instances of the determined one or more tasks to be performed at the one or more attack surfaces; and
   simulate the identified one or more attack frontiers at the determined one or more attack surfaces by executing the generated one or more virtual instances of the determined one or more tasks in a virtual simulation network, wherein the virtual simulation network mimics the physical organization network and wherein the virtual simulation network comprises virtual network assets and virtual attack surfaces emulating the physical network assets and the physical attack surfaces respectively.

6. The system as claimed in claim 1, wherein in determining one or more attack paths associated with at least one of the one or more attack surface based on results of simulation, the attack path determination subsystem is configured to:
   determine locations of the one or more attack surfaces susceptible to security attacks based on the results of simulation;
   determine possible communication channels through which the one or more attack surfaces are susceptible to the security attacks; and
   determine possible one or more attack paths associated with at least one of the one or more attack surface based on the determined possible communication channels and the locations of the one or more attack surfaces, wherein the one or more attack paths comprises a location of the communication channel connecting the one or more attack surfaces.

7. The system as claimed in claim 1, wherein in generating the artificial intelligence-based security model representing vulnerability of the one or more attack surfaces based on the learnt attack patterns, the artificial intelligence-based security model generation subsystem is configured to:
   validate the learnt attack patterns based on one or more pre-stored validation rules;
   determine whether configuration associated with the one or more digital surfaces require a change based on the validation;
   update the configuration associated with the one or more digital surfaces based on the determination;
   correlate the determined attack paths, and the validated attack patterns with the updated configuration associated the one or more digital surfaces;
   assign a risk assessment value for each of the one or more attack surface based on the correlation; and
   generate the artificial intelligence-based security model representing vulnerability of the one or more attack surfaces based on the assigned risk assessment value, wherein the artificial intelligence-based security model comprises the correlation and the risk assessment value associated with each of the one or more attack surface.

8. A method to perform automated red teaming in an organizational network, the method comprising:
   obtaining, by a processor, an input data and an exit criterion for an organization from one or more data sources via a network, wherein the input data comprises an attack graph and the exit criterion comprises a set of rules;
   automatically, by the processor, determining one or more attack surface associated with the organization based on the obtained input data and the exit criterion, wherein the one or more attack surfaces comprises least secure points in the organizational network;
   identifying, by the processor, one or more attack frontiers for each of the determined one or more attack surfaces, wherein the one or more attack frontiers comprises a set of security attacks to be launched at the determined one or more attack surface;
   prioritizing, by the processor, each of the identified one or more attack frontiers using one or more pre-defined prioritization strategies;
   simulating, by the processor, the identified one or more attack frontiers at the determined one or more attack surfaces based on the prioritization;
   determining, by the processor, one or more attack paths associated with at least one of the one or more attack surface based on results of simulation;
   continuously learning, by the processor, attack patterns associated with the determined one or more attack paths based on the results of execution using a plurality of learning techniques; and
   generating, by the processor, an artificial intelligence-based security model representing vulnerability of the one or more attack surfaces based on the learnt attack patterns, wherein the artificial intelligence-based security model comprises attack paths correlated with the attack patterns and a risk assessment value associated with each of the one or more attack surface.

9. The method as claimed in claim 8, further comprising:
   outputting the generated artificial intelligence-based model on a user interface of a user device.

10. The method as claimed in claim 8, wherein automatically determining the one or more attack surface associated with the organization based on the obtained input data and the exit criterion comprises:
   determining list of connected network assets present in an organizational network based on the obtained input data and the exit criterion, wherein the organizational network comprises one or more attack surfaces existing internally or externally of the network assets;
   determining one or more network parameters associated with the one or more attack surfaces based on the determined list of connected network assets;

determining whether the one or more network parameters matches with a corresponding pre-stored one or more network parameters; and determining the one or more attack surfaces susceptible to security attacks if the one or more network parameters fail to match with the corresponding pre-stored one or more network parameters.

11. The method as claimed in claim 8, wherein identifying one or more attack frontiers for each of the determined one or more attack surfaces comprises:

determining type of the one or more attack surfaces based on the obtained input data and the exit criterion;

determining one or more behavioral parameters associated with the one or more attack surfaces based on the obtained input data and the exit criterion and the determined type of the one or more attack surfaces, wherein the one or more behavioral parameters comprises current state, historical events, and current configuration of the one or more attack surfaces;

analyzing time series data associated with the one or more attack surfaces;

correlating the determined one or more behavioral parameters and the analyzed time series data with a corresponding pre-stored behavioral parameters and the pre-stored time series data; and identifying the one or more attack frontiers applicable to each of the determined one or more attack surfaces based on the correlation and the type of one or more attack surfaces.

12. The method as claimed in claim 8, wherein prioritizing each of the identified one or more attack frontiers using one or more pre-defined prioritization strategies comprises:

determining one or more historical successful attack paths associated with the one or more attack surfaces;

validating the one or more historical successful attack paths based on a set of predefined rules;

determining a priority assignment policy for prioritizing each of the identified one or more attack frontiers based on successful validation; and prioritizing each of the identified one or more attack frontiers based on the determined priority assignment policy.

13. The method as claimed in claim 8, wherein simulating the identified one or more attack frontiers at the determined one or more attack surfaces based on the prioritization comprises:

determining one or more tasks to be performed at the one or more attack surfaces by mapping, in the order of priority, the identified one or more attack frontiers with corresponding pre stored tasks;

generating one or more virtual instances of the determined one or more tasks to be performed at the one or more attack surfaces; and simulating the identified one or more attack frontiers at the determined one or more attack surfaces by executing the generated one or more virtual instances of the determined one or more tasks in a virtual simulation network, wherein the virtual simulation network mimics the physical organization network and wherein the virtual simulation network comprises virtual network assets and virtual attack surfaces emulating the physical network assets and the physical attack surfaces respectively.

14. The method as claimed in claim 8, wherein determining one or more attack paths associated with at least one of the one or more attack surface based on results of simulation comprises:

determining locations of the one or more attack surfaces susceptible to security attacks based on the results of simulation;

determining possible communication channels through which the one or more attack surfaces are susceptible to the security attacks; and determining possible one or more attack paths associated with at least one of the one or more attack surface based on the determined possible communication channels and the locations of the one or more attack surfaces, wherein the one or more attack paths comprises a location of the communication channel connecting the one or more attack surfaces.

15. The method as claimed in claim 8, wherein generating the artificial intelligence-based security model representing vulnerability of the one or more attack surfaces based on the learnt attack patterns comprises:

validating the learnt attack patterns based on one or more pre-stored validation rules;

determining whether configuration associated with the one or more digital surfaces require a change based on the validation;

updating the configuration associated with the one or more digital surfaces based on the determination;

correlating the determined attack paths, and the validated attack patterns with the updated configuration associated the one or more attack surfaces;

assigning a risk assessment value for each of the one or more attack surface based on the correlation; and generating the artificial intelligence-based security model representing vulnerability of the one or more attack surfaces based on the assigned risk assessment value, wherein the artificial intelligence-based security model comprises the correlation and the risk assessment value associated with each of the one or more attack surface.

* * * * *